(12) United States Patent
Fosnaugh

(10) Patent No.: US 7,249,546 B1
(45) Date of Patent: Jul. 31, 2007

(54) DIE-SHAPING APPARATUS AND PROCESS AND PRODUCT FORMED THEREBY

(75) Inventor: David L. Fosnaugh, Geneva, IN (US)

(73) Assignee: Franklin Electric Co., Ltd., Bluffton, IN (US)

( * ) Notice: Subject to any disclaimer, the term of this patent is extended or adjusted under 35 U.S.C. 154(b) by 0 days.

(21) Appl. No.: 07/699,479

(22) Filed: May 13, 1991

(51) Int. Cl.
B21D 28/22 (2006.01)
B21D 28/04 (2006.01)

(52) U.S. Cl. .............. 83/50; 83/255; 83/405; 83/418; 83/618

(58) Field of Classification Search ............ 83/33, 83/40, 50, 255, 256, 405, 418, 618, 620, 83/637, 681, 687
See application file for complete search history.

(56) References Cited

U.S. PATENT DOCUMENTS

| 1,818,150 A | | 8/1931 | Murch | |
|---|---|---|---|---|
| 1,916,379 A | * | 7/1933 | Leland | ............ 83/255 X |
| 1,962,431 A | | 6/1934 | Daley | |
| 1,992,962 A | * | 3/1935 | Murch | ............ 83/33 X |
| 2,302,571 A | | 11/1942 | Ray | ............ 29/155.5 |

(Continued)

FOREIGN PATENT DOCUMENTS

| CH | 189200 | 5/1937 |
|---|---|---|
| DE | 1042441 | 10/1958 |
| DE | 1652940 | 9/1974 |
| DE | 3012319 A1 | 10/1981 |
| DE | 3218132 A1 | 11/1983 |

(Continued)

OTHER PUBLICATIONS

David A. Smith; *Die Design Handbook*; Title page and pp. 16-11, 16-14, and 16-16; Third Edition; Publication date unknown.

(Continued)

*Primary Examiner*—Stephen Choi
(74) *Attorney, Agent, or Firm*—Marshall, Gerstein & Borun LLP

(57) ABSTRACT

A progressive die for shaping a consecutive series of discs from a strip of relatively stiff material, comprising a series of adjacent die stations including a slot cutting station, a plurality of intermediate stations, and a cut off station, the slot cutting station including cutting means for forming at least one laterally extending slot between adjacent discs while leaving at least one narrow deformable bridge connecting the adjacent discs, the intermediate stations including cutting means for shaping the discs, and the cut off station including cutting means for severing the bridge. A strip of relatively stiff material includes a series of consecutive discs formed along the length thereof, at least two adjacent discs having at least one laterally extending slot therebetween and at least one narrow deformable bridge connecting the adjacent discs. A process for die punching a series of shaped discs from a strip of relatively stiff material comprises the steps of cutting at least one slot through the strip between each pair of adjacent sections and forming at least one narrow deformable bridge connecting each pair of adjacent discs, shaping the discs between the bridges, and severing the bridges.

17 Claims, 4 Drawing Sheets

U.S. PATENT DOCUMENTS

| | | | |
|---|---|---|---|
| 2,329,392 A | 9/1943 | Crane | 164/20 |
| 2,386,147 A * | 10/1945 | Sidebotham | 83/255 X |
| 2,429,500 A | 10/1947 | Wolfner | |
| 2,489,977 A | 11/1949 | Porter | 175/356 |
| 2,552,109 A | 5/1951 | Nahman | 29/155.61 |
| 2,880,539 A | 4/1959 | Frenkel et al. | |
| 2,943,966 A | 7/1960 | Leno et al. | 154/80 |
| 2,975,312 A | 3/1961 | Ploran | 310/217 |
| 2,986,254 A | 5/1961 | Borke | |
| 3,002,263 A | 10/1961 | Feinberg et al. | 29/155.61 |
| 3,010,185 A | 11/1961 | Hume | 29/155.58 |
| 3,022,480 A | 2/1962 | Tiffany | 339/18 |
| 3,055,246 A | 9/1962 | Steinberg | |
| 3,107,566 A * | 10/1963 | Archer | 83/33 |
| 3,110,831 A | 11/1963 | Zimmerle | |
| 3,124,026 A | 3/1964 | Loeffel | |
| 3,175,277 A | 3/1965 | Brown et al. | |
| 3,181,402 A | 5/1965 | Kuck et al. | 83/32 |
| 3,213,727 A | 10/1965 | Schwennesen | 83/32 |
| 3,289,507 A | 12/1966 | Grewe | |
| 3,338,084 A | 8/1967 | Stegman, Sr. | |
| 3,388,582 A | 6/1968 | Wesstrom | |
| 3,559,136 A | 1/1971 | Specht et al. | 336/217 |
| 3,628,367 A | 12/1971 | Wiig | |
| 3,739,968 A | 6/1973 | Bodendoerfer | |
| 3,786,710 A | 1/1974 | Backlin | 83/406 |
| 3,823,460 A | 7/1974 | Bergmann | |
| 3,834,013 A | 9/1974 | Gerstle | 29/596 |
| 3,842,493 A | 10/1974 | Ohuchi et al. | 29/596 |
| 3,854,359 A | 12/1974 | Tagami | |
| 3,983,621 A | 10/1976 | Donahoo | 29/596 |
| 4,046,040 A | 9/1977 | Bourdo | |
| 4,072,039 A | 2/1978 | Nakanishi | 72/334 |
| 4,110,895 A | 9/1978 | Mitsui | 29/564 |
| 4,149,309 A | 4/1979 | Mitsui | |
| 4,285,754 A | 8/1981 | DiMatteo | |
| 4,287,797 A | 9/1981 | Seragnoli | |
| 4,318,320 A | 3/1982 | Davis | |
| 4,349,997 A | 9/1982 | Hayasaka et al. | |
| 4,524,507 A | 6/1985 | Hara et al. | |
| 4,536,952 A | 8/1985 | Shinryo et al. | 29/596 |
| 4,538,345 A | 9/1985 | Diederichs | 29/596 |
| 4,578,853 A | 4/1986 | Würth | 29/598 |
| 4,586,236 A | 5/1986 | Jones | |
| 4,597,168 A | 7/1986 | Oboshi et al. | |
| 4,619,028 A | 10/1986 | Neuenschwander | 29/33 |
| 4,624,162 A | 11/1986 | Arnold | |
| 4,641,828 A | 2/1987 | Yajima | |
| 4,692,972 A | 9/1987 | Schultes | 29/33 |
| 4,696,212 A | 9/1987 | Tokuno et al. | |
| 4,748,732 A | 6/1988 | Schultes | 29/33 |
| 4,751,417 A | 6/1988 | Krinickas, Jr. et al. | 310/211 |
| 4,845,832 A | 7/1989 | Martin et al. | |
| 4,904,539 A | 2/1990 | Kling et al. | 428/572 |
| 4,906,809 A | 3/1990 | Workman | |
| 4,993,290 A | 2/1991 | Obradovic | |
| 4,998,430 A | 3/1991 | Howe | |
| 5,163,217 A | 11/1992 | Sakanishi | |

FOREIGN PATENT DOCUMENTS

| | | |
|---|---|---|
| DE | 133849 | 3/2001 |
| EP | 0 133 858 A1 | 3/1985 |
| EP | 0 133 859 A1 | 3/1985 |
| EP | 0 251 628 | 1/1988 |
| GB | 724588 | 2/1955 |
| GB | 1 334 094 | 10/1973 |
| WO | WO88/02286 | 4/1988 |
| ZA | 855976 | 3/1986 |

OTHER PUBLICATIONS

Werkstatt und Betrieb; Von Heinz Kuckenburg; STANZEREITECHNIK; 1961; pp. 159-161 (English translation: pp. 72 and 73 attached).

American Machinist; Emil Loeffel; Segmented Rings Save Strip; Apr. 1, 1963; pp. 96-99.

Articles arthored by George Keremedjiev in the publication "Metal Forming" in the following issues: Oct. 1988; Apr. 1989; Jun. 1989; Jul. 1989; Sep. 1989.

Undated brochure from Ceara Engineering, Limited (Northern Ireland) entitled "Syncrosine-Wavelength Correction For Register Control of Scroll-Slit Metal In Fixed Feed Length Progression Tools" (eight pages).

Undated "Outline Specification" (three pages) and layouts (four pages) from Ceara Engineering, Limited (Northern Ireland) relating to Syncrosine System.

"Syncrosine With Mechanical Servo Correction" (one doubl-sided page) and layout (one page) from Ceara Engineering, Limited (Northern Ireland).

Undated letter from Jock Workman of Ceara Engineering, Limited received by the attorneys for Applicant Fosnaugh on Oct. 18, 1993 (one page).

Undated Syncrosine cover sheets from Ceara Engineering, Limited received by the attorneys for Applicant Fosnaugh on Oct. 18, 1993 (three pages).

* cited by examiner

DIE-SHAPING APPARATUS AND PROCESS AND PRODUCT FORMED THEREBY

FIELD AND BACKGROUND OF THE INVENTION

This invention relates to a process for die punching (stamping) a strip of material such as metal, to a machine for performing the process, and to a product produced by the process. While the process and apparatus described and claimed herein have utility in other fields, the specific example described and claimed herein relates to the production of steel laminations for an electromotive device such as a motor.

The conventional manner of producing laminations is by feeding a long strip of lamination steel through a progressive die. The die has a series of stations and at each station a cut is made in the steel strip, thereby progressing from strip material to finished laminations.

In one process, a strip of straight slit steel is fed into a progressive die which progressively shapes the straight strip into finished laminations. In another process, a wide sheet of metal is cut by a scroll die into a plurality of scroll or zigzag strips, each scroll strip including a series of connected precut sections or discs. Each disc is then shaped by a progressive die into a finished lamination. Further, the discs have pilot holes in them, and each station of the progressive die has pilot pins which engage the pilot holes of the discs for the purpose of orienting the discs properly in the die stations during the punching operations.

There has been a problem with the foregoing prior art procedure which has resulted in a substantial downtime and loss of lamination steel. The problem arises because the between-center spacing between the successive die stations of the progressive die is fixed but the between-center spacing, or distance, between lamination discs may vary. As a specific example, a progressive die may have a feed length of 5.787"; a spacing of 5.787"±0.0002" between stations one and two; and, because the tolerance is nonaccumulative, a spacing of 17.361"±0.0002" between stations one and four. The center-to-center distance between lamination discs, on the other hand, are variable and the variations are accumulative.

An attempt to solve the foregoing problem has been to make the between-center spacing of successive lamination discs slightly longer than the theoretical feed length. For example, the between-center dimension between the discs has been made up to 0.0020" longer than the feed length. This extra length can cause the metal strip to bow or buckle as it moves through the die; on the other hand, if the between-center spacing of the discs is not long enough, the discs cannot be fed through the die because the pilot pins of the dies cannot match the pilot holes of the discs. The result has been a disruption of the punching operation and a loss of strip metal.

It is a general object of this invention to provide improved process and apparatus for avoiding the aforementioned problems.

SUMMARY OF THE INVENTION

Apparatus in accordance with this invention comprises die means for shaping a consecutive series of discs from a strip of relatively stiff material, said die means comprising a slot cutting station, said slot cutting station including cutting means for forming at least one laterally extending slot between adjacent discs while leaving at least one narrow deformable bridge connecting said adjacent discs.

Apparatus in accordance with this invention further comprises a strip of relatively stiff material including a series of consecutive discs formed along the length thereof, at least two adjacent discs having at least one laterally extending slot therebetween and at least one narrow deformable bridge connecting said adjacent discs.

A process in accordance with this invention is for die punching a series of shaped discs from a strip of relatively stiff material, said process comprising the steps of cutting at least one slot through said strip between each pair of adjacent sections and forming at least one narrow deformable bridge connecting each pair of adjacent discs, shaping said discs between said bridges, and severing said bridges.

BRIEF DESCRIPTION OF THE DRAWINGS

The invention will be better understood from the following detailed description taken in conjunction with the accompanying figures of the drawings, wherein.

DETAILED DESCRIPTION

Figure 1:
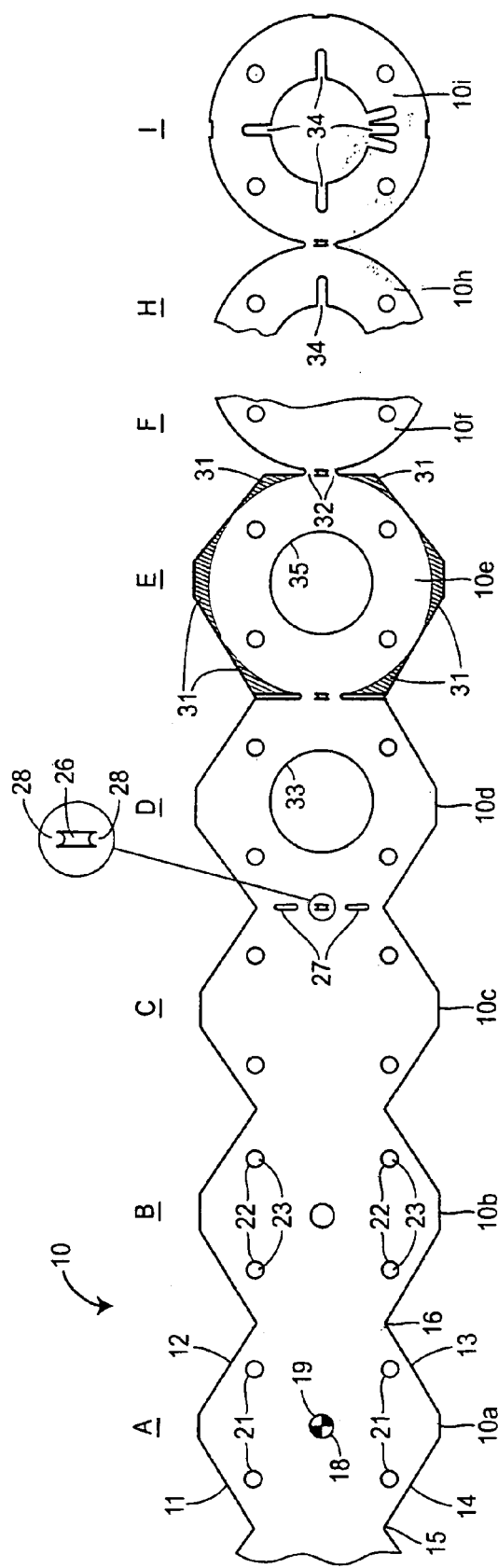
FIG. 1 illustrates a prior art apparatus and method for die forming metal laminations.

FIG. 1 illustrates a prior art process for producing laminations for an electromotive machine such as an electric motor. The laminations are punched from a strip 10 of lamination steel which is fed through a conventional progressive die (not illustrated in FIG. 1). The progressive die includes a plurality of punching stations A through I (station G being omitted because it is repetitious), and at each station a portion of the strip is removed to produce a finished rotor lamination disc at station D and a finished stator lamination disc at the final station I. A plurality of such discs are assembled in a stack to form stator and rotor cores.

The strip 10 (FIG. 1), in the received form which is fed into the die at station A, includes a series of sequential discs or sections, and in this example, discs 10a to 10f, 10h and 10i are illustrated and associated, respectively, with the die stations A through F, H and I. In the received form, each disc has four angled outer sides 11 to 14 (see disc 10a), two connecting sides 15 and 16, and a centrally located pilot hole 18.

At station A, the die includes a pilot pin 19 which extends into the pilot hole 18 and centers the disc 10a in this die station. This station also includes four punches 21 which form four round pilot holes 22. At each of the subsequent stations, four pilot pins 23 extend into the holes 22 in order to orient the discs at the stations.

At die station C, a banding slot 26 and two trim slots 27 are formed along the connecting sides of the two discs 10c and 10d. As shown by the enlargement of the slot 26, the ends 28 of the slot are angled; the ends of the slots 27 are semicircular. At station D, the rotor lamination 33 is removed from the strip.

At station E, the die includes punches which trim the outer sides of the disc 10e removing fragments 31 and a thin ring of material 35 is removed from the center of disc 10e to assure ID/OD concentricity and provide for rotor OD to stator ID clearance (air gap). It should be noted that the outer ends of the slots 27 are cut away so that the discs are thereafter attached by two relatively wide connecting sections 32 at the ends of the banding slot 26.

At the subsequent stations, the stator winding slots 34 are cut. At the final station I, a cut is formed through the connecting side along the center of the connecting sections 32 and the banding slot 26, thereby severing the finished forwardmost disc from the strip 10. The angled sides of the slot 26 result in a dovetail-shape opening which may be used to receive a banding strip that secures a stack of laminations together, in a conventional manner.

The die stations are at fixed distances apart and the tolerances are nonaccumulative, as previously explained. On the other hand, the center-to-center distances between the discs making up the strip 10 are not uniform. Consequently, the variations in the disc distances may result in a situation where the pilot pins cannot enter the pilot holes 22, resulting in disruption of the punching operation and loss of lamination metal.

Figure 2:
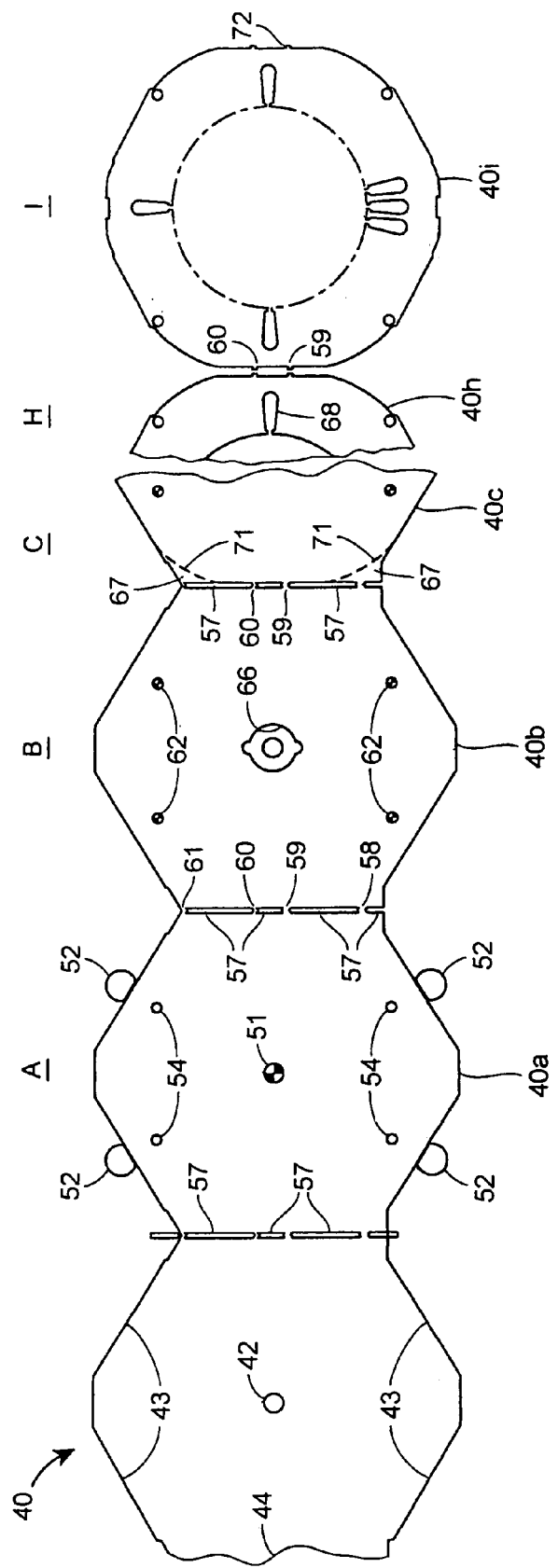
FIG. 2 illustrates apparatus and method for die forming metal laminations in accordance with this invention.
Figure 3:
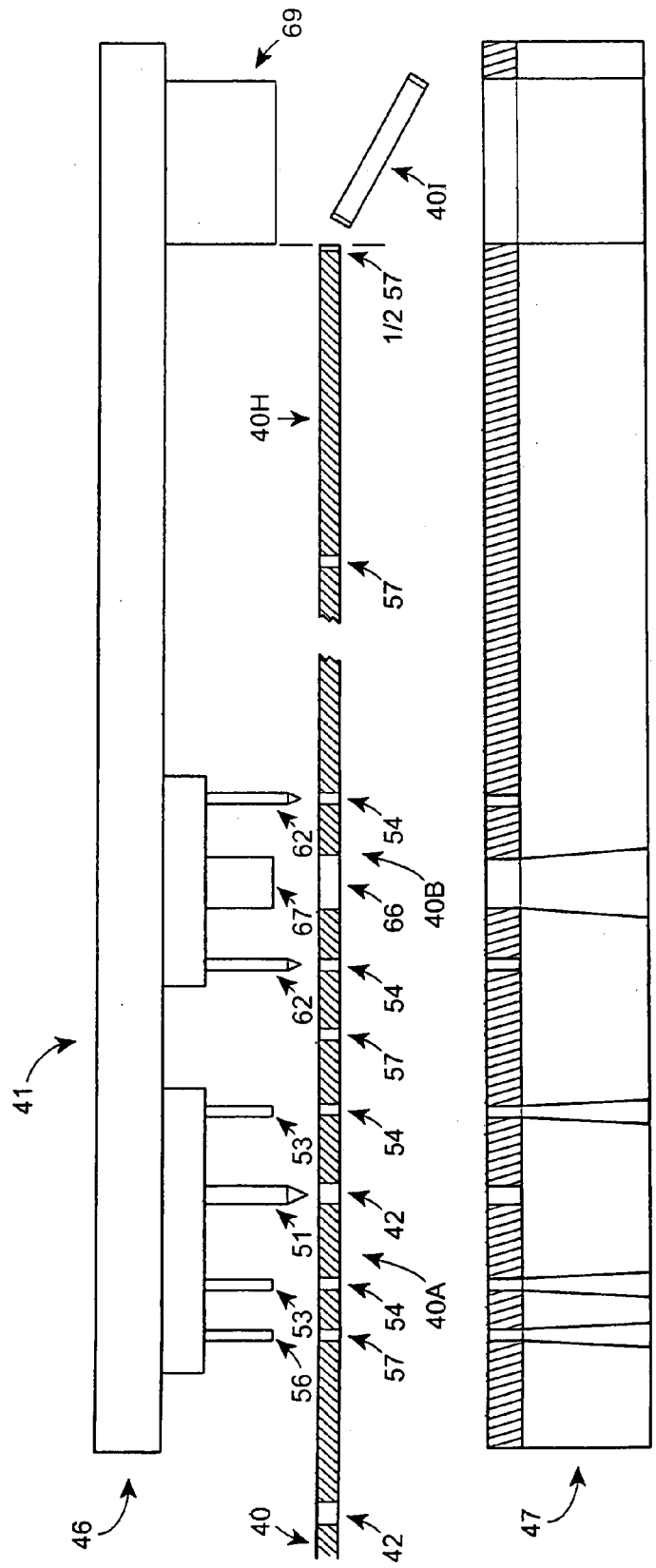
FIG. 3 is a schematic illustration of dies in accordance with this invention.

FIGS. 2 and 3 illustrate apparatus in accordance with this invention, which avoids the foregoing problem. In this specific example of the invention, a strip 40 having the same initial shape as the strip 10 shown in FIG. 1 is fed into a progressive punch and die assembly 41 shown schematically in FIG. 3. Again the progressive die set 41 may include nine stations and only stations A, B, C, H and I are illustrated in FIG. 3, and lamination discs 40a, 40b, 40c, 40h and 40i are illustrated in FIG. 2.

The strip 40 is fed into the progressive die with each disc having the initial configuration illustrated by the disc at the far left in FIG. 2. It includes a centrally located pilot hole 42, four angled sides 43, and a connecting side 44 which is joined with the next adjacent disc. This initial configuration is referred to in the trade as a scroll or zigzag shape, and it is cut from a wide sheet of lamination steel by a scroll die.

The progressive die set 41 (FIG. 3) includes an upper punching assembly 46 and a lower die assembly 47. Except for the feature described hereinafter as the invention, the die may otherwise have a conventional design. In addition to the two parts 46 and 47, the die may also include a stripper (not illustrated) between the strip 40 and the punch assembly.

Figure 5:
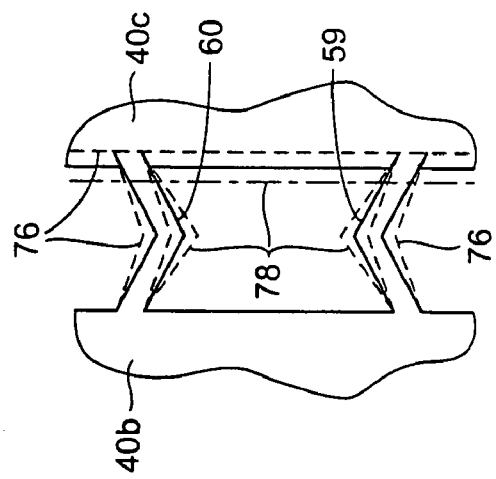
FIG. 5 is a view similar to FIG. 4.
Figure 7:
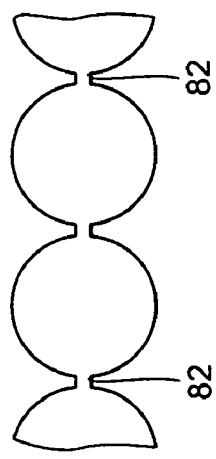
FIGS. 6 and 7 illustrate alternative embodiments of the invention.
Figure 6:
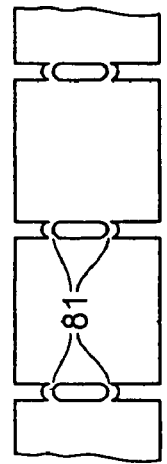

At station A, the punch assembly 46 includes a pilot pin 51 which extends into the pilot hole 42 of the disc 40a. In addition, four straddle pilots 52 (FIG. 2) engage the sides 43 of the disc 40a, the pilots 51 and 52 serving to locate the disc 40a properly. The punch assembly includes four punches 53 (FIG. 3) which punch four pilot holes 54 in the disc 40a. In addition, slot piercing punches 56 pierce a series of slots 57 through the strip 40, the slots extending laterally across the width of the strip at the connecting side 44. The slots 57 leave a plurality (in this specific example, there are four) of narrow width bridges 58 to 61 between the discs 40 and 40a. The bridges 58 to 61 preferably have an angled or chevron shape as illustrated in FIG. 2, but this is not necessary because they could instead be arcuate, straight longitudinal, etc., as illustrated in FIGS. 6 and 7. As will be described in connection with FIGS. 4 and 5, the bridges 58 to 61 are sufficiently thin and narrow (in the lateral dimension) to be deformable, and the lateral dimension needed to permit such deformation will depend on the thickness of the strip and the type of metal. As a specific example, for motor lamination steel having a thickness of 0.025±0.003 inch, each bridge has a lateral width in the range between 0.050 and 0.070 inch, a lateral width of 0.060 inch being preferred. This example is for standard material known as cold rolled semi-processed motor lamination steel.

It should be apparent that strips of other thicknesses, materials and stiffness should have other bridge dimensions. The bridges must be wide enough to hold adjacent discs together during the punching operation but sufficiently narrow that they may be deformed as will be described. Aside from the narrow bridges, the strips are otherwise stiff and not materially deformable to enable them to accommodate a misalignment of the pilots.

Following the punching of the pilot holes 54 and the slots 57, further punching operations are performed at the subsequent stations. At each station, pilot pins 62 extend into the pilot holes 54 in order to orient the discs. As examples of further punching operations, at station B a large center hole 66 is formed by a punch 67, at station C segments 67 are trimmed from the outer sides of the disc 40C, at station H, a number of winding slots 68 are formed, and at station I the forwardmost lamination is severed from the strip by making a lateral cut (using a punch 69 in FIG. 3) through the centers of the bridges 59 and 60 leaving one-half slots ½ 57 in each of the discs 40H and 40I.

In the example illustrated the two endmost bridges 58 and 61 are relatively close to the sides 43. When the segments 67 are punched out, the cut along the dashed lines 71 extends to the slots 57 and thus removes the bridges 58 and 61, leaving only the two center bridges to connect adjacent discs.

The chevron shape of the two bridges 59 and 60 result in a dove-tail shape slot 72 (FIG. 2) at the sides of a stack of the laminations, which may receive a banding strip as previously mentioned in connection with the opening 26 shown in FIG. 1. The punches 56 instead may be shaped to produce longer slots 57 and only one deformable bridge, or more than two narrow deformable bridges, for example.

As previously mentioned, a progressive die assembly of the type used to cut the strips 10 and 40 includes a series of successive stations. The center-to-center distances between the stations is fixed, and the tolerances are non accumulative. In the example previously given, the spacing between the first and second stations is 5.787"±0.0002", and the spacing between the first and fourth stations is 17.361"±0.0002". The center-to-center distances between the discs are variable, however, and the variations may prevent the pins 62 from aligning with and entering the pilot holes 54. This problem has resulted in disruption of the stamping process and considerable loss of lamination steel.

This problem is avoided in accordance with this invention by making the bridges 58 to 61 sufficiently narrow (taking into consideration the type, stiffness and thickness of the strip material) that the bridges are capable of deforming to make up for the differences in the spacing. With reference to FIG. 5, if the center-to-center distance between two adjacent discs 40b and 40c of the strip 40 is less than the center-to-center distance between two adjacent stations B and C of the die 41, the bridges stretch (since they are deformable) to the dashed line positions 76, thereby increasing the separation between the discs 40b and 40c and the center-to-center distance between them. As is apparent from the foregoing and from FIG. 2, the strip 40 and the die stations A, B, etc. have a center line extending through substantially the centers of the discs 40a, 40b, etc. and the stations, and the centers of the discs remain substantially on the center line when the bridges 58 to 61 deform. The amount of the stretch is sufficient to enable the pilot pins 62 to enter the pilot holes 54 and orient the discs at the adjacent stations. The outer ends of the pilot pins 62 may be conical to enable them to enter the pilot holes and then deform the bridges as the pins fully enter the holes.

Figure 4:
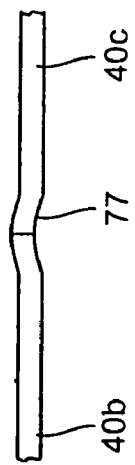
FIG. 4 is an enlarged view of fragments of laminations and illustrates this invention.

In the event the center-to-center distance between the adjacent two discs is greater than the center-to-center distance between the adjacent two stations, the bridges deform to decrease the distance between the two discs. As shown in FIG. 4, the deformation may take the form of an upward (or downward) bulge or buckle 77 of the bridges, or the bridge may deform laterally to sharpen the angle of the chevron-shaped bridges. In the latter situation, the bridges may deform to the dashed line, positions 78 in FIG. 5. In an alternative construction where the bridges extend straight lengthwise between the discs (see FIG. 7), the bridges would bulge upwardly or downwardly as shown in FIG. 4. Where the bridges are arcuate (see FIG. 6) or chevron shaped (FIG. 5), the deformation may be a combination of the two forms shown in FIGS. 4 and 5.

As is clearly shown in FIGS. 2 and 4 to 6, the length of each of the bridges 58 to 61 and 81 is greater than the width of the slots 57 punched between adjacent discs. This greater length of each bridge is due to its having at least a portion which is out of alignment with the longitudinal center line of the strip, as illustrated by the chevron and arcuate shapes shown in FIGS. 5 and 6. This greater length than the slot width (or distance between the adjacent edges of two discs) enhances the ability of the bridges to stretch or contract (see FIG. 5) and thereby change the width of the slots and the between-center distance between adjacent discs.

While the prior art strip included sections 32 between adjacent discs, the connecting sections 32 are too wide and stiff to permit their deformation as is the case with the narrow deformable bridges in accordance with this invention. As an example, the connecting sections of the prior art have been approximately 0.315 inch in lateral width.

The discs or sections of the strip may have shapes other than that shown in FIGS. 1 and 2. FIGS. 6 and 7 respectively show examples where the discs have square and round shapes. FIG. 6 further illustrates discs connected by two deformable bridges 81 which have arcuate shapes. FIG. 7 illustrates round discs connected by a single deformable bridge 82 and in this example the bridge 82 is straight longitudinal.

The discs shown in FIGS. 6 and 7 may also have pilot means cut into them for orientation at the die stations, or the die stations may be provided with straddle pilots such as the pilots 52.

While the slots forming the deformable bridges have been described as being cut at an initial station of a progressive die, it will be apparent that such slots could be cut by a separate die prior to being introduced into the progressive die. For example, these slots could be cut by the scroll die which cuts the strip 40 from the wide metal band, or a separate die may be provided for cutting such slots and pilot holes in the discs.

What is claimed is:

1. A process for punching a series of shaped motor lamination discs from an elongate strip of relatively stiff material to form adjacent discs, the process comprising the steps of simultaneously cutting and shaping said series of shaped lamination discs at a plurality of stations including a slot cutting station and a plurality of intermediate stations, said series of shaped motor lamination discs and said plurality of stations each having centers, said plurality of stations and said strip having an imaginary center line and said centers falling substantially on said center line, cutting at said slot cutting station a plurality of laterally extending slots through said strip between adjacent discs, said slot forming four angled narrow deformable bridges connecting said adjacent discs, orienting each disc of said series of shaped motor lamination discs at said intermediate stations while shaping each said disc at said intermediate stations, and enabling the distances between said adjacent discs at said intermediate stations to be both increased to match a die distance between centers of two of said plurality of stations when shorter than the die distance, and decreased to match the die distance between centers of two of said plurality of stations when longer than the die distance by simultaneously deforming said bridges while maintaining said centers of said adjacent discs substantially on said center line when the distances between said centers of said adjacent discs are respectively lesser than or greater than the distances between said centers of said stations, each of said discs having outer sides, trimming said outer sides of said discs so as to remove two of said four bridges positioned endmost adjacent said outer sides following said intermediate stations and further comprising the step of engaging said outer sides of a disc which is adjacent said slot cutting station and thereby orienting said disc at said slot cutting station while cutting said at least one slot.

2. A process according to claim 1, and further including the step of cutting said bridges at substantially equal distances on opposite sides of said center line.

3. A process as set forth in claim 1, wherein said strip comprises motor lamination steel having a thickness of approximately 0.025 inch, and said slot forms each of said bridges to a lateral width in the range between substantially 0.050 and 0.070 inch.

4. A process according to claim 1, wherein the step of engaging further comprises arranging straddle pilots at said slot cutting station to engage said outer sides of each disc while at said slot cutting station.

5. A process according to claim 1, wherein said plurality of stations further comprises a pilot hole punch at said slot cutting station, and further comprising the steps of forming one or more non-centrally located pilot holes in each disc at said slot cutting station and aligning a corresponding pilot pin into each of said pilot holes at each die station subsequent to said slot cutting station to thereby lengthwise position and orient said discs at each of said intermediate stations.

6. A process according to claim 1, wherein the step of cutting further comprises forming said four bridges being formed having a chevron shape.

7. A combination of a progressive die and a strip of lamination material, said die including a series of adjacent die stations including an initial die station and additional die stations following said initial die station arranged along an imaginary center line, said stations including punches for cutting said strip and die pilots for positioning said strip, the die distances between said die pilots of successive stations being substantially constant, and said strip being shaped by said die, said strip including a series of sections having strip pilot holes for mating with said die pilots, the strip distances between said strip pilot holes at times being variable and at times longer and at times shorter than said die distances between said die pilots, each of said sections including a geometric center, and four angled deformable bridges connecting adjacent sections of said strip, said die including a slot cutting punch for punching a plurality of laterally extending slots forming said four bridges, said sections being relatively stiff and said at least two deformable bridges being sized to both lengthen when said strip distance is shorter than said die distances between said die pilots, and shorten when said strip distance is longer than said die distances to thereby adjust said strip distances of said adjacent sections between said strip pilot holes in order to compensate for said longer and shorter distances between said strip pilot holes while maintaining said geometric centers substantially on said imaginary center line at said additional die stations, said sections having outer sides, said die further includes punches for trimming said outer sides of said sections so as to remove two of said four bridges positioned endmost adjacent said outer sides following said additional die stations and said die further including straddle pilots for engaging with said outer sides of at least one of said sections adjacent said slot cutting punch and for accurately locating said one of said sections.

8. A combination of a progressive die and a strip of lamination material according to claim 7, wherein said strip has a scroll or zig-zag shape.

9. A combination of a progressive die and a strip of lamination material according to claim 7, wherein two of said bridges are provided on each side of and spaced from said center line.

10. A combination of a progressive die and a strip of lamination material according to claim 9 wherein at least one of said bridges has a chevron shape.

11. A combination of a progressive die and a strip of lamination material according to claim 9, wherein at least one of said bridges has an arcuate shape.

12. A combination of a progressive die and a strip of lamination material according to claim 7, wherein at least one of said four deformable bridges has a chevron shape.

13. A combination of a progressive die and a strip of lamination material according to claim 7, wherein said strip comprises motor lamination steel having a thickness of approximately 0.025 inch, and said die cuts each of said bridges to a lateral width in the range between substantially 0.650 inch and 0.070 inch.

14. A combination of a progressive die and a strip of lamination material according to claim 13, wherein said lateral width is substantially 0.660 inch.

15. A combination of a progressive die and a strip of material according to claim 7, wherein at least one of said at least two deformable bridges has an arcuate shape.

16. A combination of a progressive die and strip of lamination material according to claim 7, wherein said at least two deformable bridges each has a chevron shape.

17. A combination of an elongate progressive lamination die assembly and a strip of lamination material, said die assembly having a longitudinal axis and a series of successive die stations including an initial die station and additional die stations following said initial die station serially disposed along said longitudinal axis, the center-to-center spacing along said longitudinal axis between die centers of each pair of adjacent die stations being fixed, at least some of said die stations including punches for shaping a series of interconnected lamination discs in an elongate scroll metal strip, the center-to-center spacing between the geometric centers of adjacent discs in said strip being at times longer and at times shorter than said fixed center-to-center spacing between said die centers of each pair of said adjacent die stations, a slot punch for forming a plurality of elongate slots extending in a lateral direction transverse to said longitudinal axis and four angled narrow bridges spaced apart in said lateral direction by said elongate slots, said four bridges being deformable for maintaining accurate progression of said discs along said longitudinal axis through said die stations despite variations in said center-to-center spacing in said geometric centers of adjacent discs in said strip by enabling changes to the center-to-center spacing along said longitudinal axis between said geometric centers of adjacent discs, said bridges being sufficiently narrow in said lateral direction to deform to both lengthen said center-to-center spacing along said longitudinal axis between said geometric centers of said adjacent discs when said center-to-center spacing is shorter than said fixed center-to-center spacing between said die centers, and shorten said center-to-center spacing along said longitudinal axis between said geometric centers of said adjacent discs when said center-to-center spacing is longer than said fixed center-to-center spacing between said die centers, said narrow deformable bridges and said elongate slots being aligned in said lateral direction at said additional die stations said die assembly further includes punches for trimming outer sides of said discs so as to remove two of said four bridges positioned endmost adjacent said outer sides following said additional die stations, and straddle pilots physically disposed in said die assembly at a die station adjacent to said slot punch for physically engaging four sides of a disc in said die station and for accurately locating said physically engaged disc in said die station while said elongate slots and said four narrow bridges are being formed by said slot punch.

* * * * *